Feb. 3, 1942.          C. RASKA                 2,271,713
                  AGRICULTURAL APPARATUS
              Filed Sept. 3, 1940         3 Sheets-Sheet 1

INVENTOR
CHARLIE RASKA
BY William A. Zalesak
ATTORNEY

Feb. 3, 1942.  C. RASKA  2,271,713
AGRICULTURAL APPARATUS
Filed Sept. 3, 1940   3 Sheets-Sheet 2

INVENTOR
CHARLIE RASKA
BY William A. Zalesak
ATTORNEY

Feb. 3, 1942.  C. RASKA  2,271,713
AGRICULTURAL APPARATUS
Filed Sept. 3, 1940  3 Sheets-Sheet 3
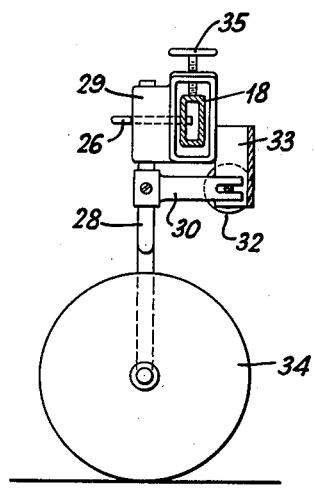
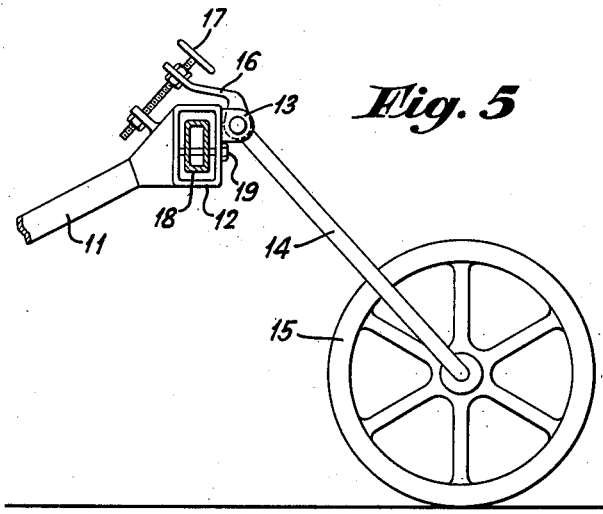
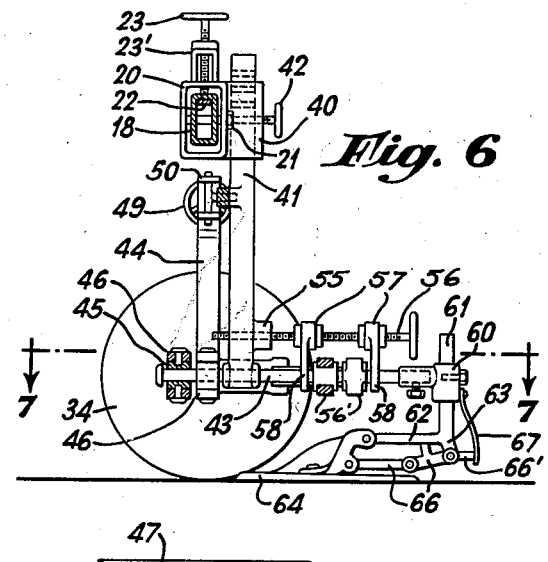
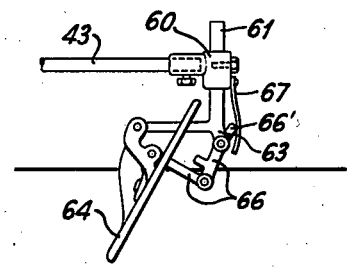
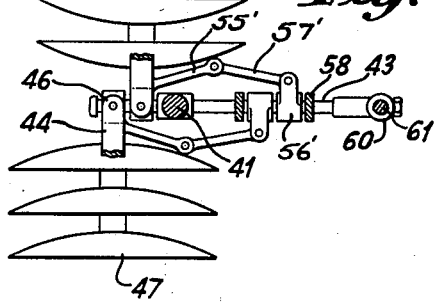
INVENTOR
CHARLIE RASKA
BY William A. Jalesak
ATTORNEY Patented Feb. 3, 1942

2,271,713

UNITED STATES PATENT OFFICE 2,271,713

AGRICULTURAL APPARATUS

Charlie Raska, Corpus Christi, Tex., assignor of one-half to Louis J. Raska, Sinton, Tex.

Application September 3, 1940, Serial No. 355,199

14 Claims. (Cl. 55—73)

My invention relates to agricultural apparatus such as cultivators, and more particularly to improvements in disc harrows.

In conventional devices of this kind employing a plurality of gangs of discs, adjustments of the discs are not simple but require elaborate lever and link mechanisms and locking devices or require the use of wrenches on numerous nuts and bolts which are used in combination with toothed or corrugated blocks which support the discs. While some independent movement of gangs of discs is permitted in some types now available, this relative movement is not all that can be desired and sudden drops or rises in the ground being cultivated jar the apparatus and place stress on the gang of discs and plow. No means are provided for balancing the forces exerted on the different sets of harrow discs. The sweep or plow used for cultivating or knocking down the ridge between the center gangs of discs should be rigid and strong yet yieldable when encountering heavy objects.

It is therefore the principal object of my invention to provide an agricultural device of the disc harrow type in which the support for the gang of discs is simple in construction and permits easy adjustment to permit the disc to be simply and positively adjusted in either vertical or horizontal planes as well as to permit spacing between the gangs of discs to be easily changed.

It is another object of my invention to permit independent movement of the gangs of discs and yet have means for adjusting the load between the gangs and to provide a floating action for the center gangs of discs.

Another object of my invention is to provide a strong but yieldable support of simplified design for the center sweep which permits vertical adjustment to cooperate with the balance of the center gang of discs.

A still further object of my invention is to provide an apparatus of this kind which is of strong and rigid construction, but which can be easily disassembled for repairing and cleaning.

Figure 1:
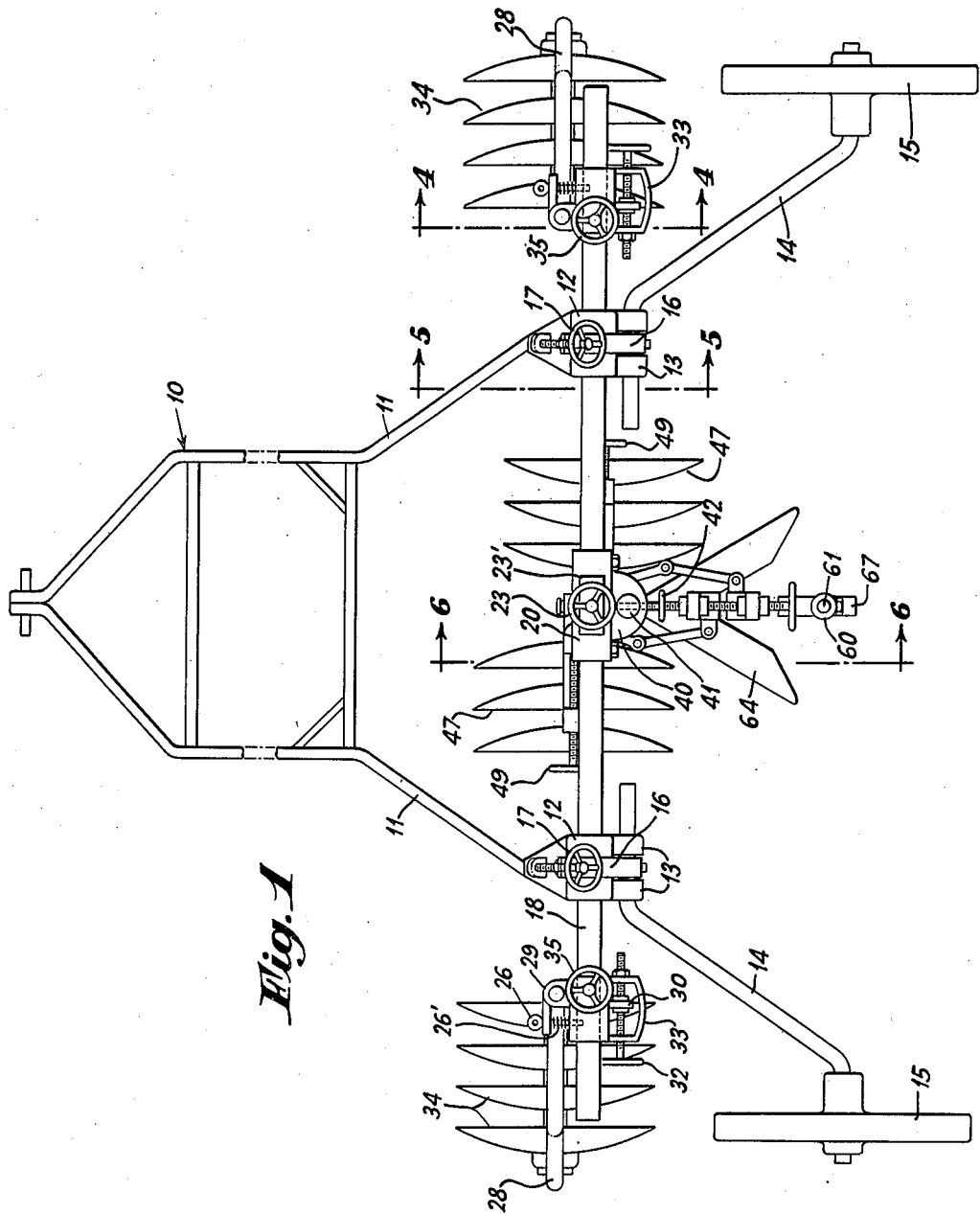
Figure 2:
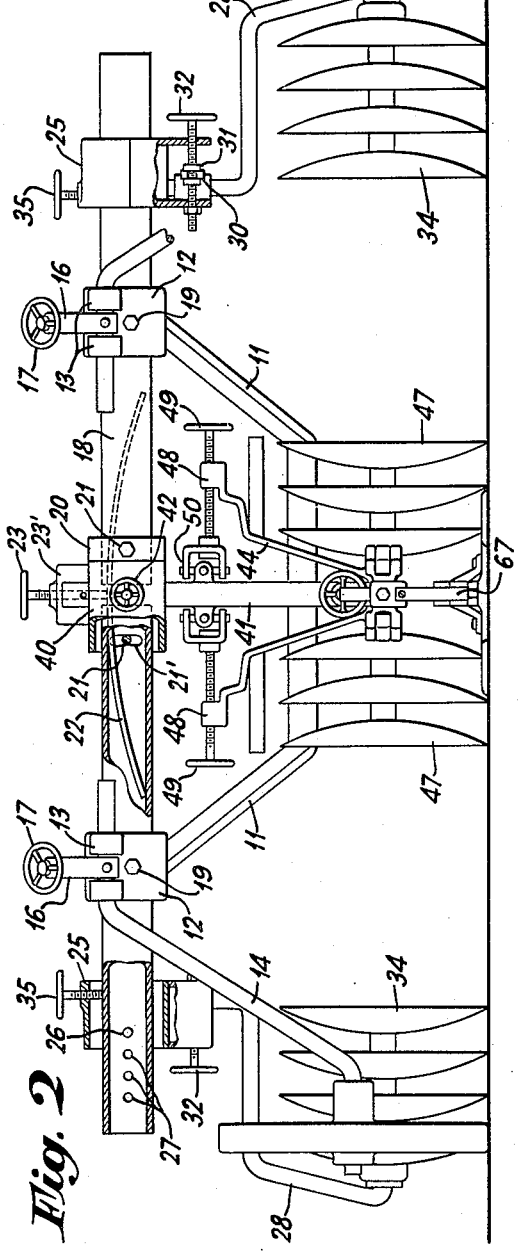
Figure 3:
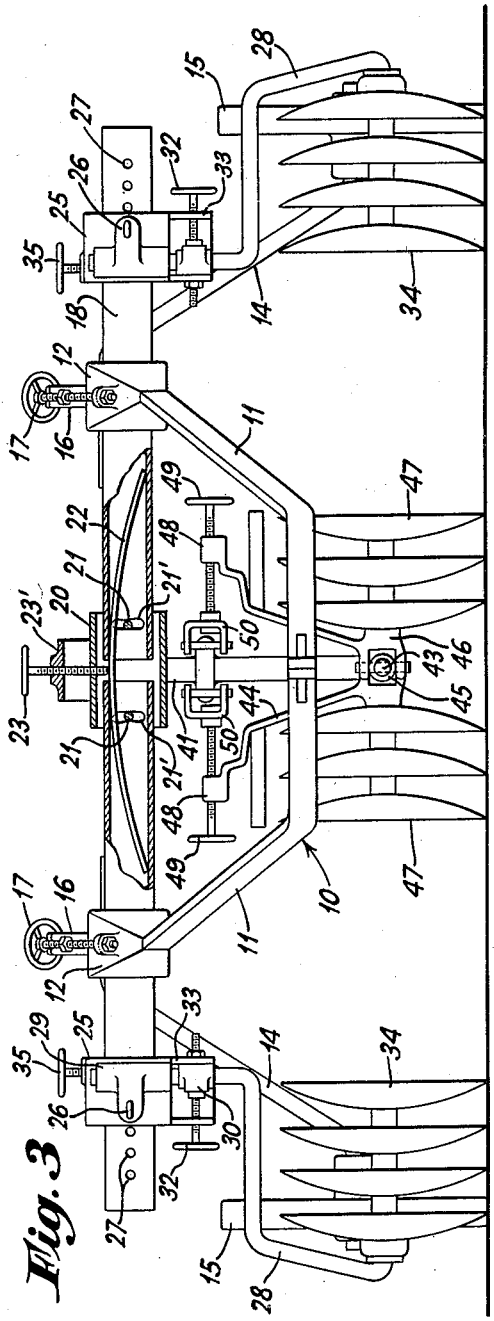

The novel features which I believe to be characteristic of my invention are set forth with particularity in the appended claims, but the invention itself will best be understood by reference to the following description taken in connection with the accompanying drawings, in which Figure 1 is a plan view of the apparatus, Figure 2 is a rear elevation, Figure 3 is a front elevation, Figures 4, 5 and 6 are sections taken along the lines indicated in Figure 1 to show details of construction, Figure 7 is a horizontal section taken along the line indicated in Figure 6 and Figure 8 shows details of construction of the sweep in released position.

A supporting frame for a gang of discs includes a frame extension 10 to be secured to a prime mover, for example, a tractor or the like and is provided with rigid arms or rear extensions 11 provided at their upper ends with journal boxes 12—12, supporting parts to be described. As best shown in Figures 1, 2 and 5 these journal boxes are provided with rearwardly extending bosses provided with bearings 13, 13 through which shaft and extension members 14 rotatably supporting guide wheels 15 extend and are rotatably supported. To adjust the relative position of the shafts 14 and guide wheel 15 with respect to the frame, there is fixed to the shaft portion within the bearings 13 a lever 16, which is in turn connected to the wheel and screw arrangement 17 for rotating the lever 16, shaft 14 and wheel 15 about the bearing. By rotating the lever 16 in a clockwise direction the rear end of the frame is raised and likewise by rotating lever 16 in a counterclockwise direction the frame is lowered. The screw 17 may rotate in its support but is fixed against longitudinal movement.

This frame provides a support for two center gangs of discs and plow or sweep and two outer gangs of discs, gangs of discs being supported from beam members pivotally supported within the journals 12 as will be described in more detail below.

As best shown in Figures 1, 2, 3 and 5, the beam members 18 are hollow shaped beams of rectangular cross section and pivotally mounted in the journals 12 by means of the pins 19. Thus, the beams can rotate in a vertical plane within limits about the pins within the journal boxes. The adjacent inner ends of the beams are pivotally connected by a journal and support member 20 through which pins 21 extend into apertures 21' provided in the adjacent ends of the beam members as best shown in Figure 3. This journal and support member 20 while it pivotally connects adjacent ends of the two beam members also supports the center gang of discs and screw in a floating manner to be described, the gang of discs being adjustable vertically in height and horizontally and vertically as to angle.

The method of providing a floating action of the center gang of discs and plows can be seen by reference to Figures 1, 2 and 3. A bow spring 22 is positioned within the hollow beams and engages the inner lower surfaces of the beams, the tension in the spring being determined by a wheel and screw 23 supported in an extension 23' and engaging the upper bow of the spring. By adjusting the screw inwardly so as to press down on the intermediate portion of the bow, the tension is increased thereby tending to raise the gang of discs and plow. This spring provides the floating action of the center gang of discs when uneven ground is encountered. The details of the inner gang of discs, their adjustments in all planes and of the plow or sweep will be described below.

Mounted on the outer ends of the beams are the outer gangs of discs. The assembly comprises journal box and support 25 as best seen in Figures 2 and 4, slidable longitudinally of the beams but retained in pivotal position on the beams by means of pin 26 carried by journal box 25 and extending through any of the apertures 27 of the beam to fix the position along the beam. This permits the adjustment of the journal box to vary the spacing between the inner and outer gangs of discs. By being so pivoted the journal may be rotated in a plane about the pin in the manner to be described. The pin 26 is maintained in position by biasing spring 26' which permits quick and easy release of the pin to adjust the journal along the axis to any one of the desired apertures 27 to receive the pin. A journal rotatably supports the shaft and extension 28 rotatably in a boss 29 extending forward of the beam (Figures 1 and 4). This support permits angular adjustment of the discs in a horizontal plane. As best shown in Figures 1, 3 and 4 the means for accomplishing this includes an arm or lever 30 fixed to the portion of the shaft extending through the boss 29 and having a forked end engaged in a travelling nut 31 on an adjusting screw 32. The screw is rotatably carried by a loop support 33 on the journal 25 but fixed against longitudinal movement. By adjustment of the screw 32 the nut may be made to travel in one direction or the other to move the end of the lever and thus rotate the shaft and extension 28 within the boss 29 to adjust the angular position of discs 34. Thus the adjustment in a horizontal plane can be effected. To adjust the gang of discs in a vertical plane the journal box 25 is provided with wheel and screw member 35 engaging the upper side of the beam 18. Adjustment of this screw rotates journal box 25 about the pin 26 and thus adjusts the angular position of the outer gang of discs in a vertical plane. The outer gang of discs on both beams may be adjusted in the same manner.

The support and adjustment of the center gang of discs is best shown in Figures 1, 2, 3 and 6. The journal box and pivoted connecting member 20 has extending rearwardly of it a boss and bearing 40 in which is slidably mounted in a vertical position a shaft and support rod 41 fixed in position by set screw 42. This shaft carries the two center gangs of discs and the sweep. Referring to Figures 6 and 7 it will be observed that shaft 41 carries perpendicular to it in a horizontal position at its lower end a second shaft 43. Each frame 44 carrying one gang of discs is supported to permit vertical and horizontal adjustment and is provided at its lower end with a collar 45 (Figure 6) rotatably mounted on its shaft and a fork member or yoke 46 engaging the collar for permitting rotation in a horizontal plane about the collar 45 so that movement of the frame in all planes is possible. The frame carries on its lower end a gang of discs 47.

The upper end of the frame 44 is provided with a threaded bushing 48 through which an adjusting screw 49 extends and is engaged, the screw being rotatably engaged at its inner end with universal coupling member 50 fixed to the shaft 41 as best shown in Figures 2 and 3. The end of the screw member 49 is rotatably mounted in the coupling member but is fixed against longitudinal movement with respect to this member. To adjust the position of the frame and discs in a vertical plane the screw 49 may be rotated in either direction.

The adjustment of the center gang of discs in a horizontal plane is next described. This is best shown in Figures 6 and 7. The lower end of the shaft 41 is provided with boss 55 for rotatably receiving screw member 56. There are provided on the screw travelling nuts 57 provided with arms 58 through which the shaft 43 extends. These arms are slidable along the shaft upon adjustment of the screw member 56. The screw 56 is fixed against longitudinal movement. Connected to the frame members 44 are levers 55' which are in turn connected to the travelling bosses 56' by the links 57'. As the bosses are moved forward the gang of discs are rotated toward each other to provide an angle therebetween. When the bosses are moved backward away from the shaft 41 the gang of discs are rotated so that their shafts are moved parallel to each other, the frames rotating in different directions. Thus, while the screws 49 provide the adjustments for the vertical plane the screw 56 provides adjustment for the horizontal movement so that the gangs of discs can be rotated in all planes.

In order to knock down the center ridge which may result from the action of the center gang of discs, I provide a central plow or sweep provided with a yielding support so that it will clear obstructions when necessary. As shown in Figures 1, 2, 6 and 8, at the end of the shaft 43 is provided a T 60 through which extends vertical shaft 61 adjustable vertically and having extensions 62 and 63. The plow 64 is pivotally connected to the forward end of the extension 62 and a link mechanism 66 is pivotally connected between the plow and extension 63; extension 66' being provided for cooperating with biasing spring 67 which normally maintains the plow in the position shown in Figure 6. When an obstruction is encountered the lower end of the plow is tilted forward and the link mechanism and spring assume the position shown in Figure 8. Spring 67 will maintain the plow in the position shown in Figure 6 when it is again brought to this position.

From the above detailed description it will be observed that I have provided a disc plow arrangement of improved design which is simple in construction and permits quick and easy adjustment of the gangs of discs in all planes as well as permitting easy change of spacing between the gangs of discs. By providing a floating support for the center gang of discs the load between the gangs can be distributed.

The novel and improved support of the sweep is of simplified design and while permitting yielding upon engaging with an obstruction, also permits a vertical adjustment to provide the proper cooperation with the floating support of the center gang of discs. By eliminating nuts and bolts and providing a wheel and screw arrangement all adjustments have been simplified and the device provides a construction which permits ease of assembly and repair.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A cultivator having a rigid frame including a pair of extensions, a beam pivotally supported in each extension for movement in a vertical plane, means for pivotally connecting adjacent ends of said beams and supporting earth working members, earth working members on the outside ends of said beams, all of said earth working members being in line.

2. A cultivator having a rigid frame including a pair of extensions, a beam pivotally supported in each extension for movement in a vertical plane, means for pivotally connecting adjacent ends of said beams and supporting earth working members, earth working members on the outside ends of said beams, all of said earth working members being in line, and resilient means between the adjacent ends of said beams and the means for pivotally connecting adjacent ends of said beams to give the earth working members supported by said last means a floating action with respect to the other earth working members.

3. A cultivator having a rigid frame including a pair of extensions, a hollow tubular beam pivotally supported in each extension for movement in a vertical plane, means for pivotally connecting adjacent ends of said beams and supporting earth working members, earth working members on the outside ends of said beams, all of said earth working members being in line, and a spring member contacting the interior of said hollow tubular beams and the means for pivotally connecting adjacent ends of said beams to give the earth working members supported by said last means a floating action.

4. A cultivator having a rigid frame including a pair of extensions, a hollow tubular beam pivotally supported in each extension for movement in a vertical plane, said beams being in line, means for pivotally connecting adjacent ends of said beams and supporting inner earth working members, earth working members supported on the outside ends of said beams, and a bow spring member extending through the means for pivotally connecting the adjacent ends of said beams and contacting the interior of said hollow tubular beams to give the inner earth working members a floating action, and means for adjusting the tension in said spring.

5. A cultivator having a rigid frame, a beam supported on said frame, and a support for supporting a gang of discs, said support including a hollow journal member through which said beam extends, said hollow journal member being mounted for pivotal movement in a vertical plane, and means for rotating said journal member in said vertical plane, a shaft and extension rotatably supported by said journal for rotation in a horizontal plane, a gang of discs supported on said extension, a lever secured to said shaft and screw means connected between said journal member and said lever for rotating the shaft in a horizontal plane to vary the angular position of said gang of discs in a horizontal plane.

6. A cultivator having a rigid frame including a pair of beams supported in line, and supports on the outer ends of said beams for supporting gangs of discs, each of said supports including a hollow journal member through which a beam extends, said beams being provided with a plurality of aligned apertures and a removable pin extending through said journal member and through one of said apertures in a beam whereby pivotal movement of said journal on said beam in a vertical plane is permitted, removal of said pin permitting longitudinal movement of said journal along said beam to vary the spacing between said gangs of discs, a shaft and extension rotatably supported by each journal for rotation in a horizontal plane, a gang of discs supported on said extension and means for adjusting the journals in a vertical plane and the shaft and extension in a horizontal plane to vary the angular position of said gangs of discs in all planes.

7. A cultivator having a rigid frame, a beam supported on said frame, and a support for supporting a gang of discs, said support including a hollow journal member through which said beam extends, said hollow journal member being mounted for pivotal movement in a vertical plane and a shaft and extension rotatably supported by the journal for movement in a horizontal plane, a gang of discs supported on said extension and means for adjusting the journal in a vertical plane and the supporting shaft and extension in a horizontal plane to vary the angular position of said gang of discs in all planes.

8. A cultivator having a rigid frame including a support provided with a vertical element for supporting a gang of discs, a frame mounted on said vertical element at its lower end to have rotational movement in a vertical and horizontal plane and at its upper end to have rotational movement in a vertical and horizontal plane, a gang of discs supported by said frame and means for causing movement of said frame in vertical and horizontal planes.

9. A cultivator having a rigid frame including a pair of extensions, a beam pivotally supported in each extension for movement in a vertical plane, said beams being in line, means for pivotally connecting adjacent ends of said beams and for supporting earth working members, a vertical shaft and support mounted in said means for pivotally connecting the beams, a horizontal shaft supported at the lower end of said vertical shaft, a frame mounted on said shafts to have a rotating movement in vertical and horizontal planes, and a screw member engaging the upper end of said frame and connected to said vertical element to have movement in vertical and horizontal planes with respect to said vertical element, said screw member providing adjustment in a vertical plane of the gang of discs supported by said frame.

10. A cultivator having a rigid frame including a pair of extensions, a beam pivotally supported in each extension for movement in a vertical plane, said beams being in line, means for pivotally connecting adjacent ends of said beams and for supporting earth working members, a vertical shaft and support mounted in said means for pivotally connecting the beams, a horizontal shaft supported at the lower end of said vertical shaft, a frame mounted on said shafts to have a rotating movement in vertical and horizontal planes, and a screw member engaging the upper end of said frame and connected to said vertical element to have movement in vertical and horizontal planes with respect to said vertical element, said screw member providing adjustment in a vertical plane of the gang of discs supported by said frame, and a lever and link mechanism connected to said frame and to means on said horizontal shaft having movement toward and from said vertical shaft and means for moving said last means to rotate said frame and gang of discs in a horizontal plane.

11. A cultivator having a rigid frame including a pair of extensions, a beam pivotally supported in each extension for movement in a vertical plane, said beams being in line, means for pivotally connecting adjacent ends of said beams and for supporting earth working members, a vertical shaft and support mounted in said means for pivotally connecting the beams, a horizontal shaft supported at the lower end of said vertical shaft, a pair of oppositely disposed frames mounted on said shafts to have a rotating movement in vertical and horizontal planes, and a screw member engaging the upper end of each of said frames and connected to said vertical element to have movement in vertical and horizontal planes with respect to said vertical element, said screw members providing adjustment in a vertical plane of the gang of discs supported by said frames, and lever and link mechanisms connected to said frames and to means on said horizontal shaft having movement towards and from said vertical shaft and means for moving said last means to rotate said frames and gang of discs in a horizontal plane toward and away from each other.

12. A cultivator having a rigid frame including a pair of parallel extensions, a hollow tubular beam pivotally supported in each extension for movement in a vertical plane, said beams being in line, means for pivotally connecting adjacent ends of said beams and for providing a support for earth working members, and earth working members supported on the outside ends of said beams, all of said working members being in line, a spring member within and contacting the interior of the adjacent ends of said hollow beams to give the earth working member supported by the means pivotally connecting the adjacent ends of the beams a floating action, a pair of frames supported from said means for pivotally connecting the adjacent ends of said beams, said frames being supported to have rotational movement in vertical and horizontal planes and means for adjusting said frames in either of said planes, and supporting means for the earth working members on the outside ends of said beams at the outer ends of said frames having rotational movement in horizontal and vertical planes for permitting angular adjustment of the outside earth working members in vertical or horizontal planes.

13. A cultivator having a rigid frame including a pair of extensions, supports within said extensions for supporting center gangs of discs and outer gangs of discs, the support for the inner gangs of discs including a support for a yieldable plow including a pair of extensions at an angle to each other, a plow pivotally mounted on one extension and connected at the other by a link mechanism and a resilient element for maintaining the plow in one position but permitting movement to another position.

14. A cultivator having a rigid frame including a pair of extensions, supports within said extensions for supporting center gangs of discs and outer gangs of discs, the support for the inner gangs of discs including a support for a yieldable plow including a pair of extensions at an angle to each other, a plow pivotally mounted on one extension and connected at the other by a link mechanism having an extension and a spring member engaging said extension for maintaining the plow in one position but permitting movement to another position.

CHARLIE RASKA.